US008635635B2

(12) United States Patent
Ray et al.

(10) Patent No.: US 8,635,635 B2
(45) Date of Patent: Jan. 21, 2014

(54) FACTORING MIDDLEWARE FOR ANTI-PIRACY

(75) Inventors: Kenneth Ray, Seattle, WA (US); Gennady Medvinsky, Redmond, WA (US); Vijay Gajjala, Sammamish, WA (US); Darko Kirovski, Kirkland, WA (US); Benjamin Livshits, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 218 days.

(21) Appl. No.: 13/013,567

(22) Filed: Jan. 25, 2011

(65) Prior Publication Data
US 2012/0192209 A1    Jul. 26, 2012

(51) Int. Cl.
*G06F 9/44*    (2006.01)
*H04L 9/28*    (2006.01)

(52) U.S. Cl.
USPC ............................................. 719/330; 726/30

(58) Field of Classification Search
None
See application file for complete search history.

(56) References Cited

U.S. PATENT DOCUMENTS

| 7,789,757 | B2 | 9/2010 | Gemelos et al. |
| 2002/0087883 | A1 | 7/2002 | Wohlgemuth et al. |
| 2005/0044359 | A1 | 2/2005 | Eriksson et al. |
| 2008/0060085 | A1* | 3/2008 | Samzelius et al. .............. 726/30 |
| 2009/0313319 | A1 | 12/2009 | Beisiegel et al. |
| 2009/0328227 | A1 | 12/2009 | Cook et al. |
| 2010/0186095 | A1 | 7/2010 | Ray et al. |

OTHER PUBLICATIONS

Chun, et al., "Dynamically Partitioning Applications between Weak Devices and Clouds", Retrieved at <<http://berkeley.intel-research.net/bgchun/dynamic-partitioning-mcs10.pdf >>, Proceedings of the 1st ACM Workshop on Mobile Cloud Computing and Services, MCS, Jun. 15, 2010, pp. 5.
Chong, et al., "Secure Web Applications via Automatic Partitioning", Retrieved at http://www.cs.cornell.edu/andru/papers/swift-sosp07.pdf >>, ACM SIGOPS 21st Symposium on Operating Systems Principles, Oct. 14-17, 2007, pp. 14.
"Anti-Piracy—Software protection and Game protection", Retrieved at <<http://www.peguard.com/ >>, Retrieved Date: Oct. 12, 2010, pp. 2.

* cited by examiner

*Primary Examiner* — Andy Ho
*Assistant Examiner* — Abdou Seye
(74) *Attorney, Agent, or Firm* — Alleman Hall McCoy Russwell & Tuttle LLP

(57) ABSTRACT

Embodiments are disclosed that relate to hindering unauthorized use or distribution of a middleware program contained within an application. One example embodiment provides a method for hindering unauthorized use or distribution of a middleware program contained within an application. The method comprises acquiring factored middleware code, the factored middleware code having a missing function residing on a remote computing device, and building an application around the factored middleware code such that the application is configured to call to the remote computing device for execution of the missing function during use. The application may be configured to send a call to the remote computing device for execution of the missing function during use.

17 Claims, 4 Drawing Sheets

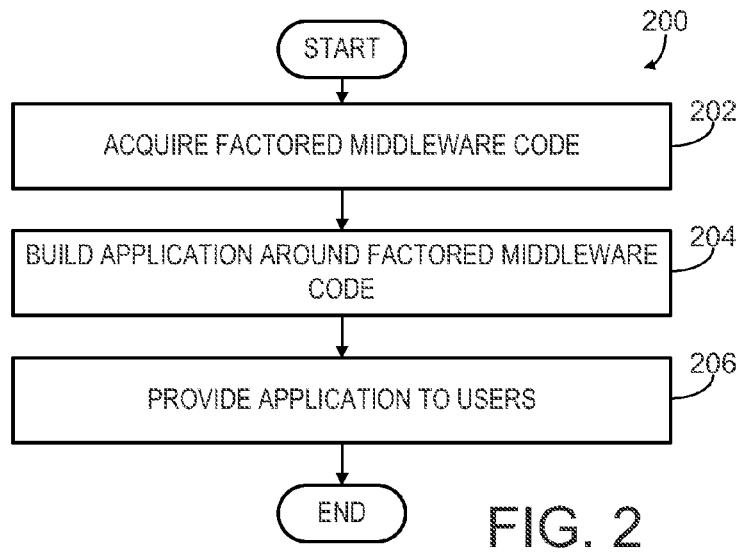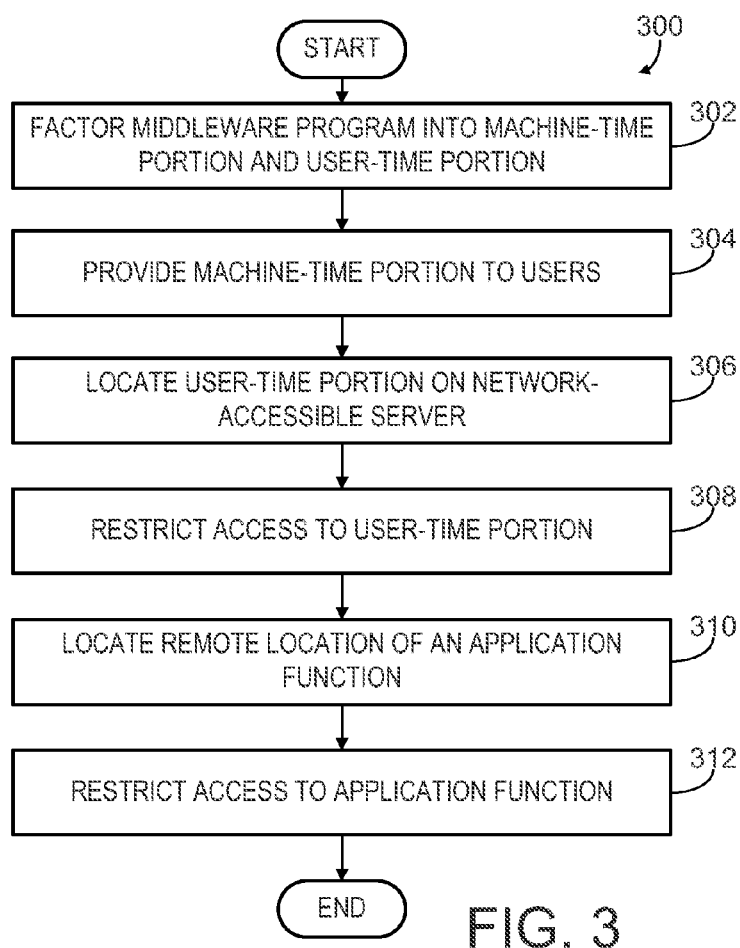

FACTORING MIDDLEWARE FOR ANTI-PIRACY

BACKGROUND

Computer programs for personal computers are prone to reverse engineering. For example, license enforcement code in such programs may be detected and disabled by editing a program's machine code. As a consequence, once a computer program hits the market, adversarial users may reverse engineer its protection mechanism and produce a new copy that appears functionally equivalent to the genuine copy, but with disabled anti-piracy enforcement.

SUMMARY

Various embodiments are disclosed that relate to hindering unauthorized use or distribution of a middleware program contained within an application. For example, one disclosed embodiment provides a method for hindering unauthorized use or distribution of a middleware program contained within an application. The method comprises acquiring factored middleware code, the factored middleware code having a missing function residing on a remote computing device, and building an application around the factored middleware code such that the application is configured to call to the remote computing device for execution of the missing function during use. Such an application may be configured to send a call to the remote computing device for execution of the missing function during use.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an embodiment of a method of hindering unauthorized use or distribution of a middleware program contained within an application.

FIG. 3 shows another embodiment of a method of hindering unauthorized use or distribution of a middleware program contained within an application.

DETAILED DESCRIPTION

Figure 1:
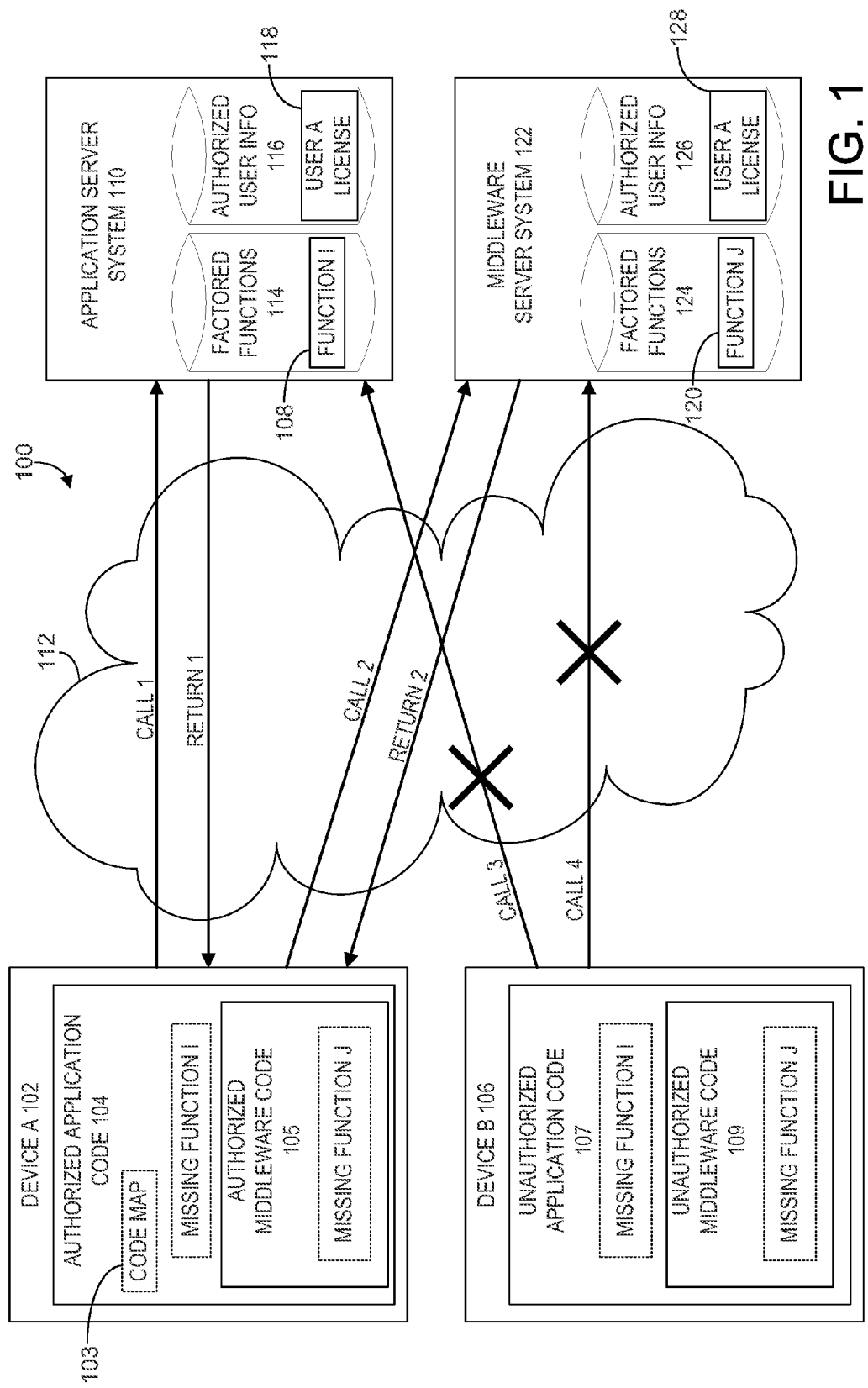
FIG. 1 shows an embodiment of an example use environment for a middleware program contained within an application.

Recent developments in anti-piracy technology have led to the development of split computational anti-piracy methods. Split computational methods involve partitioning, or factoring, a program into two or more pieces that are executed remotely from one another. For example, in some implementations, a smaller, functionally important piece of a program is located on a server, while the remainder of the program is located on a client. The client executes the program up to a point where the control flow leads to the server partition. The client then may prepare the appropriate data as input and make a remote procedure call to the functionality present at the server. If the client copy of the program is authorized, the server executes the call and returns results to the client. On the other hand, if the client copy is not authorized or if the server detects tampering attempts, the server will refuse to execute the call or will execute the call differently than it would for authorized clients, thereby disrupting execution of the program on the client.

In some examples, such programs may be built around middleware code provided by a middleware developer. Middleware developers create products that allow developers of applications to incorporate pre-built elements (middleware code) into program applications thus easing development of graphics, sounds, physics, and artificial intelligence functions. For example, a video game application may be built around middleware game engine code, in order to accelerate development of the application. The middleware then remains part of the application which is built around it.

Middleware programs are also prone to reverse engineering and often do not have a direct connection with an end user to ensure that anti-piracy methods are implemented. Further, application developers which utilize middleware code in application development may not have sufficient incentive to ensure that the middleware code included in an application is piracy-protected. Further, for the purposes of this disclosure, middleware may include a variety of program types including but not limited to scripts, programs, interpreted code, etc. Likewise an application may include a variety of executables, virtual machine code, run-time environments, sandboxes, etc.

Accordingly, embodiments are disclosed that relate to hindering unauthorized use or distribution of a middleware program contained within an application. Prior to discussing hindering unauthorized use or distribution of a middleware program contained within an application, an embodiment of an example use environment is described with reference to FIG. 1.

Use environment 100 includes a first computing device A 102, on which an authorized copy of application code 104 is running. The authorized copy of application code 104 on computing device A includes a copy of authorized middleware code 105 from which the application is built around. Use environment 100 also includes and a second computing device B 106 on which an unauthorized copy 107 of the application code is running. The unauthorized copy of application code on computing device B includes an unauthorized copy 109 of middleware code.

In the depicted embodiment, both the authorized and unauthorized versions of the application code are missing one or more functions that instead reside on an application server system 110 that is accessible via network 112. It will be understood that the term "function" and the like as used herein to describe factored code may signify any code portion separated from the rest of an application or program. The missing function i may be selected for separation from the rest of the application code based upon various considerations, including but not limited to an importance of the use of function 108 to a satisfying user experience, a difficulty of inferring an operation of the function 108 from an input/output analysis, any economic and/or computing resource costs associated with the remote hosting of the function 108, and other such considerations. While the missing function i is depicted as being stored on an application server system 110, it will be understood that the missing function may be stored on any suitable remote computing device. Further, it will be understood that the term "server" as utilized herein may refer to any such remote computing device that hosts one or more missing functions.

In addition, in the depicted embodiment, both the authorized and unauthorized versions of the middleware code included in the application are missing one or more middleware functions that instead reside on a middleware server system 122 that is accessible via network 112. As above, the missing function j may be selected for separation from the rest of the middleware code based upon various considerations, including but not limited to an importance of the use of function j 120 to a satisfying user experience when included in an application, a difficulty of inferring an operation of function j 120 from an input/output analysis, any economic and/or computing resource costs associated with the remote hosting of function j 120, and other such considerations. While the missing function j is depicted as being stored on a middleware server system 122, it will be understood that the missing function j may be stored on any suitable remote computing device. It will further be understood that the middleware server system 122 may be different from the application server system.

The application code may additionally include a code map 103. The code map indicates the location of the code to be run by the application. For example, the code map 103 may be a library such as a manifest file or xml document which includes location information of both application and middleware functions called by the application.

Application server system 110 comprises a factored function store 114 in which missing function i is stored, and also comprises an authorized user information store 116 in which information on authorized users may be stored. As an example, FIG. 1 depicts a "user A license" 118, corresponding to the user of computing device A 102, as being stored on application server system 110. In contrast, no license is stored for the unauthorized copy running on computing device B.

Likewise, middleware server system 122 comprises a factored function store 124 in which missing function j is stored, and also comprises an authorized user information store 126 in which information on authorized users may be stored. As an example, FIG. 1 depicts a "user A license" 128, corresponding to the user of computing device A 102, as being stored on middleware server system 122. In contrast, no such license is stored for the unauthorized copy of middleware code running on computing device B.

FIG. 1 also illustrates example communication between application server system 110 and computing devices A and B. As computing device A executes the application code, upon reaching a point in code at which it needs to utilize the missing function 108, computing device A calls the missing function 108 at the application server system 110 via network 112, illustrated as call 1. Application server system 110 receives the call, determines that computing device A is running an authorized copy of the application code, and then executes the function and returns a result to computing device A, illustrated as return 1. On the other hand, when computing device B calls the missing function 108, illustrated as call 3, application server system 110 determines that computing device B is not running an authorized copy of the application code, and does not execute missing function 108 and return a result to computing device B. In this case, various different failure modes are possible.

FIG. 1 also illustrates example communication between middleware server system 122 and computing devices A and B. As computing device A executes middleware code, upon reaching a point in the middleware code at which it needs to utilize the missing function j 120, computing device A calls the missing function 120 at the middleware server system 122 via network 112, illustrated as call 2. Middleware server system 110 receives the call, determines that computing device A is running an authorized copy of the middleware code, and then executes the function and returns a result to computing device A, illustrated as return 2. On the other hand, when computing device B calls the missing function j 120, illustrated as call 4, middleware server system 110 determines that computing device B is not running an authorized copy of the middleware code, and does not execute missing function j 120 and return a result to computing device B. As above, various different failure modes are possible.

Figure 4:
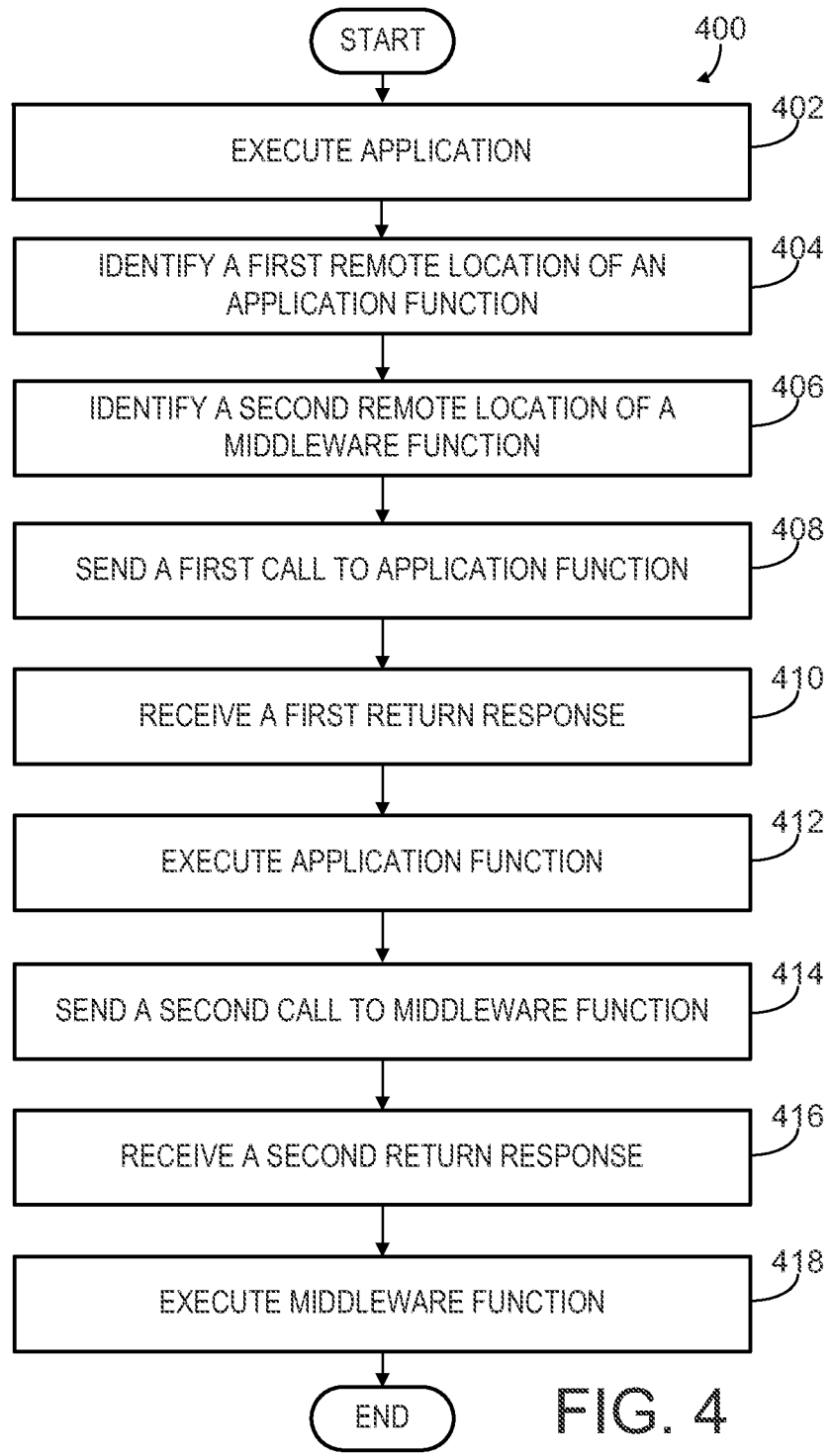
FIG. 4 shows another embodiment of a method of hindering unauthorized use or distribution of a middleware program contained within an application.

FIGS. 2-4 show example embodiments of methods for hindering unauthorized use or distribution of a middleware program contained within an application. As a non-limiting example, the application may be a video game and the middleware may be a game engine. An application including middleware code may be executed on a client device, including but not limited to a personal computer, mobile device, server, notepad computer, notebook computer, video game console, television, or on any other suitable device.

Turning now to FIG. 2, an embodiment of a method 200 of hindering unauthorized use or distribution of a middleware program contained within an application is shown and described from the point of view of a developer of an application which integrates middleware code in its development.

At 202, method 200 includes acquiring factored middleware code, wherein the acquired factored middleware code has a missing function residing on a remote computing device. For example, referring briefly back to FIG. 1, a developer of an application may acquire middleware code which is missing function j that resides on middleware server system 122. In some examples, the missing function may additionally be encrypted with one or more keys or the like residing on a remote computing device, e.g., residing on middleware server system 122.

In some examples, a middleware program may include one or more configuration files or metafiles and an execution library or libraries for interpreting the one or more configuration files or metafiles to render middleware output. Thus, acquiring middleware code may include acquiring an execution library for interpreting a configuration file of the middleware code.

Middleware may include user-time code and machine-time code. For example, in a video game application, middleware user-time code may render interactions and camera movements of non-player characters or other independent entities interacting with a rendered environment when executed by the application. The intelligence around how these systems move or interact or how a world map is interpreted, applied, and generated, etc. are all part of the user-time updates. On the other hand, machine-time code may render and output updates at each frame of an output to a display when executed. For example, middleware machine-time code may render lighting effects, shimmers, moving clouds, actual running of pixel shaders and vertex shaders, etc.

Thus, acquiring factored middleware code at 202 may include acquiring a machine-time portion of the middleware program such that the missing function is a user-time portion of the middleware program. In this way, machine-time code may be run on a local device, e.g., computing device A 102, whereas at least a portion of the user-time middleware code may reside on a remote device, such as middleware server system 122. For example, the high level logic and tools for interpreting metafiles created by a middleware program may be factored out onto a remote server, e.g., middleware server system 122, and the intermediary state may be shuttled back to a client computing device for interpretation by execution libraries of the product, e.g., when the metafiles are included in an application provided to a user. In other words, a middleware developer can create hosted tools that application developers can interact with, where the hosted tools produce the metafiles around which applications may be built. In this way, these hosted middleware tools can create metafiles that are protected because they reside on a protected remote server or because they are encrypted with keys residing on a protected remote server.

Continuing in FIG. 2, at 204, method 200 includes building an application around the acquired factored middleware code such that the application is configured to call to the remote computing device for execution of the missing function during use. For example, a developer of an application may incorporate middleware code into an application and configure the application to call a middleware server system to execute the missing function when the application is executed. The application may be further configured to locate the missing function residing on a remote computing device, for example, via a code map, and restrict access to the missing function to allow authorized users to execute the missing function to the exclusion of unauthorized users.

In some examples, non-middleware portions of the application may be factored by an application developer in addition to middleware portions. In this case, the application may be configured to identify a first remote location of a factored application function and a second remote location of a factored middleware function, e.g., via a code map. Following identification of the remote locations of the application function and the middleware function, the application may be configured to send a first call to the application function and receive a first return response and in response to the first return response, execute the application function; and send a second call to the middleware function and receive a second return response; and in response to the second return response, execute the middleware function. In this way, both the middleware code and the application code may utilize split computational anti-piracy methods so that both the application developer and the middleware developer protect their respective code from piracy.

Continuing in FIG. 2, at 206, method 200 includes providing the application to users. For example, after developing an application which incorporates factored middleware code, a developer may publish the application or provide access to the application so that users may execute the application.

Turning now to FIG. 3, another embodiment of a method 300 of hindering unauthorized use or distribution of a middleware program contained within an application is shown and described from the point of view of a middleware developer.

At 302, method 300 includes factoring a middleware program into a machine-time portion and a user-time portion. For example, this step may be performed by a middleware developer who desires to provide middleware code to application developers while implementing split computational anti-piracy methods prior to the middleware's incorporation into an application.

At 304, method 300 includes providing the machine-time portion to users. For example, the user-time portion of the middleware may reside on a remote computing device, e.g., middleware server system 122, and a developer of the middleware code may supply the machine-time portion of the middleware code to an application developer for use in an application. In some examples, the user-time portion may be encrypted with one or more keys residing on the network-accessible server for additional piracy protection. As described above, the user-time portion may include a configuration file and providing the machine-time portion to users may include providing an execution library for interpreting the configuration file when users execute the application.

At 306, method 300 includes locating the user-time portion on a network accessible server, e.g., middleware server system 122. Locating the user-time portion on a network-accessible server may be performed via a code map, for example. At 308, method 300 includes restricting access to the user-time portion to allow authorized users to execute the user-time portion to the exclusion of unauthorized users.

As described above, in some examples, the application may be factored by an application developer in addition to the factoring performed on the middleware code by the middleware developer. Thus, at 310, method 300 includes locating a remote location of an application function via a code map, where the remote location is different from a location of the user-time portion on the network-accessible server. For example, as shown in FIG. 1, an application may locate function 108 on the application server system 110 and missing function 120 on the middleware server system 122.

At 312, method 300 includes restricting access to the application function to allow authorized users to execute the application function to the exclusion of unauthorized users. For example, the application function may be configured to execute for authorized users, and enable a failure mode if an unauthorized user attempts to execute the function.

Turning now to FIG. 4, another embodiment of a method 400 of hindering unauthorized use or distribution of a middleware program contained within an application, is shown and described from the point of view of a client device, e.g., computing device A shown in FIG. 1.

At 402, method 400 includes executing the application. The application may be executed on a client device, including but not limited to a personal computer, mobile device, server, notepad computer, notebook computer, video game console, television, etc.

At 404, method 400 includes identifying a first remote location of an application function via a code map. In some examples, the application function may be encrypted with a first key residing on the first remote location, e.g., on application server system 110.

At 406, method 400 includes identifying a second remote location of a middleware function via the code map, the second remote location being different from the first remote location.

At 408, method 400 includes sending a first call to the application function. At 410, method 400 includes receiving a first return response. At 412, method 400 includes, in response to the first return response, executing the application function.

At 414, method 400 includes sending a second call to the middleware function. At 416, method 400 includes receiving a second return response. At 418, method 400 includes executing the middleware function in response to the second return response. In some embodiments, the called middleware function is a user-time function.

In the embodiment of FIG. 4, both the middleware and non-middleware portions of the application are factored, but it will be understood that, in other embodiments, one or the other of the middleware and non-middleware functions may be factored.

Figure 5:
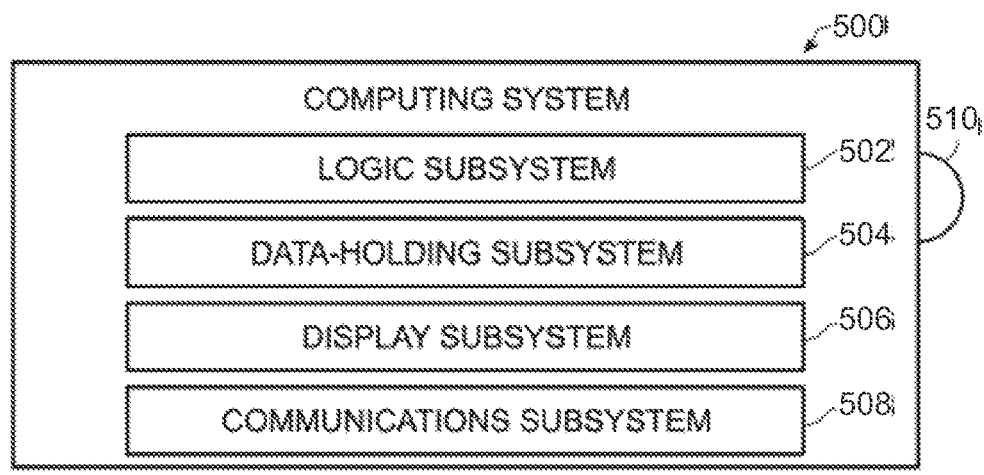
FIG. 5 shows a block diagram depicting an embodiment of a computing device.

FIG. 5 schematically shows a nonlimiting computing system 500 that may perform one or more of the above described methods and processes. Computing system 500 may represent any of computing device A 102, computing device B 106, application server system 110, and middleware server system 122 of FIG. 1.

Computing system 500 is shown in simplified form. It is to be understood that any suitable computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc.

Computing system 500 includes a logic subsystem 502 and a data-holding subsystem 504. Computing system 500 may optionally include a display subsystem 506, communication subsystem 508, and/or other components not shown in FIG. 5. Computing system 500 may also optionally include user input devices such as keyboards, mice, game controllers, cameras, microphones, and/or touch screens, for example.

Logic subsystem 502 may include one or more physical devices configured to execute one or more instructions. For example, the logic subsystem 502 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 502 may include one or more processors that are configured to execute software instructions. Additionally or alternatively, logic subsystem 502 may include one or more hardware or firmware logic machines configured to execute hardware or firmware instructions. Processors of logic subsystem 502 may be single core or multicore, and the programs executed thereon may be configured for parallel or distributed processing. The logic subsystem may optionally include individual components that are distributed throughout two or more devices, which may be remotely located and/or configured for coordinated processing. One or more aspects of logic subsystem 502 may be virtualized and executed by remotely accessible networked computing devices configured in a cloud computing configuration.

Data-holding subsystem 504 may include one or more physical, non-transitory, devices configured to hold data and/or instructions executable by logic subsystem 502 to implement the herein described methods and processes. When such methods and processes are implemented, the state of data-holding subsystem 504 may be transformed (e.g., to hold different data).

Data-holding subsystem 504 may include removable media and/or built-in devices. Data-holding subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 504 may include devices with one or more of the following characteristics: volatile, nonvolatile, dynamic, static, read/write, read-only, random access, sequential access, location addressable, file addressable, and content addressable. In some embodiments, logic subsystem 502 and data-holding subsystem 504 may be integrated into one or more common devices, such as an application specific integrated circuit or a system on a chip.

FIG. 5 also shows an aspect of the data-holding subsystem in the form of removable computer-readable storage media 510, which may be used to store and/or transfer data and/or instructions executable to implement the herein described methods and processes. Removable computer-readable storage media 510 may take the form of CDs, DVDs, HD-DVDs, Blu-Ray Discs, EEPROMs, and/or floppy disks, among others.

The term "program" may be used to describe an aspect of computing system 500 that is implemented to perform one or more particular functions. In some cases, such a program may be instantiated via logic subsystem 502 executing instructions held by data-holding subsystem 504 It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The term "program" and "engine" is meant to encompass individual or groups of executable files, data files, libraries, drivers, scripts, database records, etc.

Display subsystem 506 may be used to present a visual representation of data held by data-holding subsystem 504. As the herein described methods and processes change the data held by the data-holding subsystem, and thus transform the state of the data-holding subsystem, the state of display subsystem 506 may likewise be transformed to visually represent changes in the underlying data. Display subsystem 506 may include one or more display devices utilizing any suitable type of technology. Such display devices may be combined with logic subsystem 502 and/or data-holding subsystem 504 in a shared enclosure, or such display devices may be peripheral display devices.

Communication subsystem 508 may be configured to communicatively couple computing system 508 with one or more other computing devices. Communication subsystem 508 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for hindering unauthorized use or distribution of a middleware program contained within an application, the method comprising:
   acquiring factored middleware code, the factored middleware code having a missing function residing on a remote computing device;
   building an application around the factored middleware code such that the application is configured to:

call to the remote computing device for execution of the missing function during use;

identify a first remote location of an application function and a second remote location of a middleware function via a code map, the first remote location being different from the second remote location;

send a first call to the application function and receive a first return response;

in response to the first return response, execute the application function;

send a second call to the middleware function and receive a second return response; and in response to the second return response, execute the middleware function.

2. The method of claim 1, wherein acquiring factored middleware code includes acquiring a machine-time portion of the middleware program, and the missing function is a user-time portion of the middleware program.

3. The method of claim 1, further comprising providing the application to users, and wherein the application is further configured to locate the missing function residing on the remote computing device.

4. The method of claim 1, wherein the missing function includes a configuration file, and wherein acquiring factored middleware code includes acquiring an execution library for interpreting the configuration file.

5. The method of claim 1, wherein the code map is a manifest file.

6. The method of claim 1, wherein the application is a video game and the middleware program is a game engine.

7. The method of claim 1, wherein the application is further configured to send a call to the remote computing device for execution of the missing function during use.

8. The method of claim 1, wherein the missing function is encrypted with a key residing on the remote computing device.

9. A method for hindering unauthorized use or distribution of a middleware program in an application, the method comprising:

factoring the middleware program into a machine-time portion and a user-time portion, wherein the user-time portion renders interactions of entities with a rendered environment when executed by the application, and wherein the machine-time portion renders and outputs updates at each frame of an output to a display when executed by the application;

providing the machine-time portion to users;

locating at least a part of the user-time portion on a network-accessible server and restricting access to the user-time portion to allow authorized users to execute the user-time portion to the exclusion of unauthorized users;

locating another application function at a network-accessible location and restricting access to the other application function to allow authorized users to execute the other application function to the exclusion of unauthorized users; and providing locations of the user-time portion on the network-accessible server and the other application function at the network-accessible location to the users via a code map.

10. The method of claim 9, wherein the user-time portion includes a configuration file and providing the machine-time portion to users includes providing an execution library for interpreting the configuration file to users.

11. The method of claim 9, wherein the code map is a manifest file.

12. The method of claim 9, wherein the application is a video game and the middleware program is a game engine.

13. The method of claim 9, wherein the user-time portion is encrypted with a key residing on the network-accessible server.

14. A computing device, comprising:

a logic subsystem; and a data holding subsystem comprising machine-readable instructions stored thereon that are executable by the logic subsystem to:

execute an application;

while executing the application, identify a first remote location of an application function and a second remote location of a middleware function via a code map, the first remote location being different from the second remote location;

send a first call to the application function and receive a first return response;

in response to the first return response, execute the application function;

send a second call to the middleware function and receive a second return response; and in response to the second return response, execute the middleware function.

15. The computing device of claim 14, wherein the code map is a manifest file.

16. The computing device of claim 14, wherein the application is a video game and the middleware program is a game engine.

17. The computing device of claim 14, wherein the application function is encrypted with a first key residing on the first remote location and the middleware function is encrypted with a second key residing on the second remote location.

* * * * *